March 19, 1963     O. F. ZEDLER, JR     3,081,910
AUTOMATIC FLUID FLOW CONTROL

Filed Nov. 25, 1960     5 Sheets–Sheet 1

INVENTOR.
OTTO F. ZEDLER, JR.,
BY Frank S. Troidl
ATTORNEY.

March 19, 1963  O. F. ZEDLER, JR  3,081,910
AUTOMATIC FLUID FLOW CONTROL
Filed Nov. 25, 1960  5 Sheets-Sheet 5

INVENTOR.
OTTO F. ZEDLER, JR.,
BY Frank S. Troidl
ATTORNEY.

United States Patent Office 3,081,910
Patented Mar. 19, 1963

3,081,910
AUTOMATIC FLUID FLOW CONTROL
Otto F. Zedler, Jr., Bellaire, Tex., assignor, by mesne assignments, to Esso Research and Engineering Company, Elizabeth, N.J., a corporation of Delaware
Filed Nov. 25, 1960, Ser. No. 71,474
2 Claims. (Cl. 222—22)

This invention relates to the control of fluid flow through conduits.

In the control of fluid flow through a conduit, it may be desirable or required by law that the volume of fluid through a fluid conduit be limited to a predetermined maximum volume during a predetermined time period. For example, in some oil producing states, Texas being an example, a state administrative agency controls the amount of oil which is permitted to be flowed through a pipeline from a lease area. Thus, for a particular lease or pipeline gathering system, a "daily allowable" and a "monthly allowable" may be set for a particular month. The "daily allowable" is the maximum volume of oil allowed to be produced within a day's period. The "monthly allowable" is the maximum overall amount of oil allowed to be produced during the month. The "daily allowable" for a certain lease might be 100 barrels per day with an overall "monthly allowable" of 2000 barrels. Thus, an oil pipeline control system would allow not more than 100 barrels to enter the pipeline each day. However, if all of the previous day's 100 barrel allowable has not been moved out, then the remaining quantity may be added to the current day's 100 barrel allowable to permit delivery of 200 barrels total for the two-day period. The control system must also provide means for cutting off the supply of oil through the pipeline when the overall monthly allowable of 2000 barrels has been flowed.

This invention is an automatic system for measuring the volume of fluid flowed in a conduit and limiting the volume of fluid to a predetermined maximum for a predetermined time period. Thus, in the above example, this system automatically shuts off the flow of oil through a flowline if the maximum of 100 barrels daily allowable is obtained before the end of the day. If less than the predetermined maximum has flowed by the end of the predetermined time peirod, this system automatically provides for the make-up of the difference during the next producing time period. Thus, if less than 100 barrels is flowed in a particular day, say 50 barrels, this system automatically provides for the addition of the remaining 50 barrels to the 100 barrels to be produced in the next succeeding day.

The invention as well as its several advantages will be further understood by reference to the following description and drawings in which.

Figure 1:
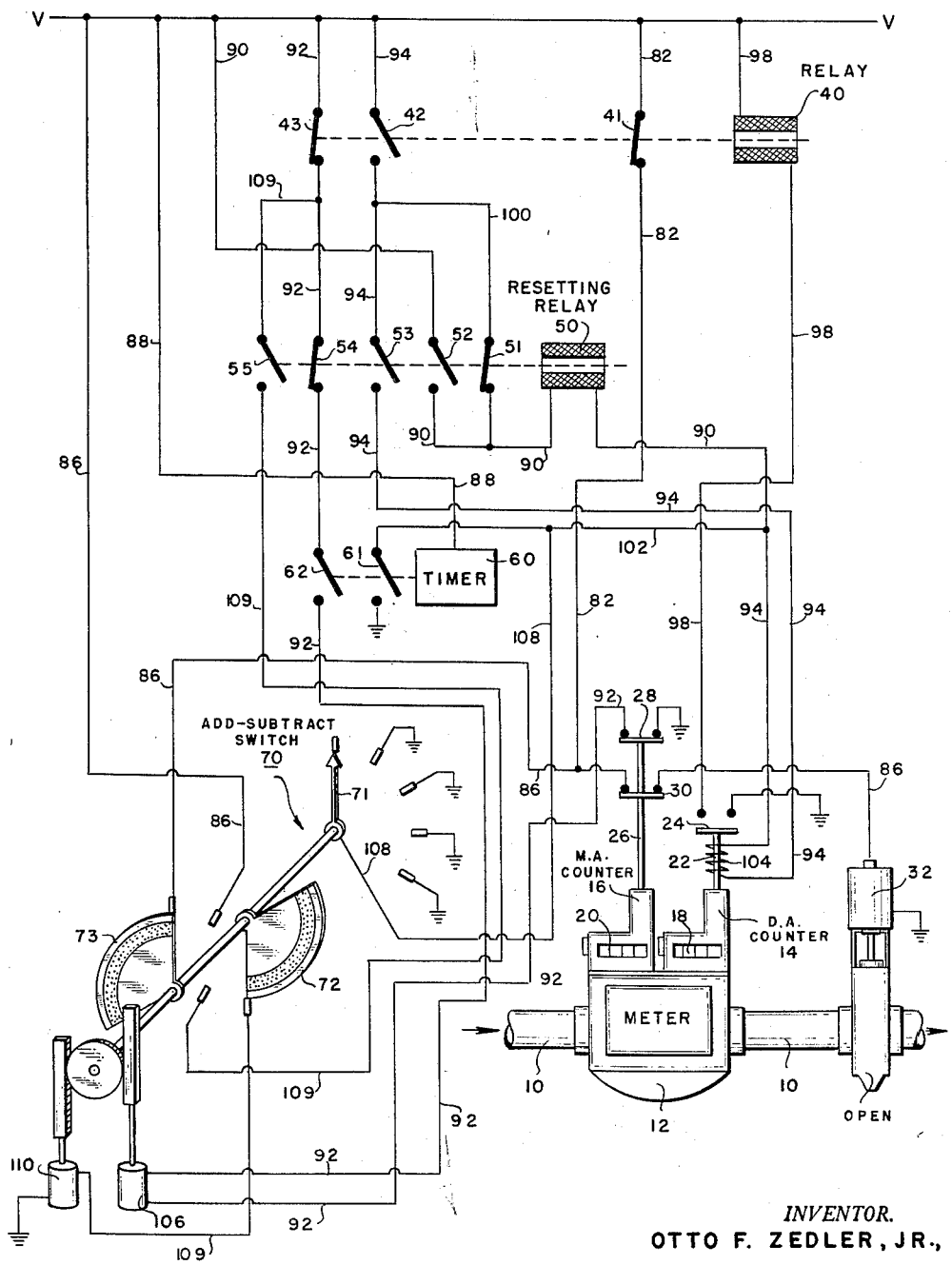
FIG. 1 is an electrical diagram showing the position of the elements while oil is being flowed through the pipeline during the producing day.

Referring to the figures, the fluid, such as oil, is pumped through the pipeline 10. The volume of fluid which has flowed through the pipeline 10 is measured by means of a meter 12. The meter 12 has mounted thereon a daily allowable counter 14 and a monthly allowable counter 16. Windows 18 and 20 are provided in the daily allowable counter 14 and monthly allowable counter 16, respectively, to provide an indication of the amount of fluid which has flowed through the pipeline 10 during the day and month, respectively.

The daily allowable counter 14 may be preset so that when the daily allowable has flowed through the pipeline 10, a shaft 22 having an electrical contact 24 is actuated to shut off the flow of fluid through the pipeline 10. Likewise, the monthly allowable counter 16 may be preset so that when the monthly allowable has flowed through the pipeline 10, a shaft 26 which includes electrical contacts 28 and 30 is moved to shut off the flow of fluid through the pipeline 10. The fluid flow may be terminated by breaking a circuit to a solenoid valve 32. In the alternative, the electrical circuit to the electrical pumping unit may be broken to shut off the flow of fluid.

The new automatic control system includes a relay 40 having a normally closed switch 41, a normally open switch 42, and a normally closed switch 43. A resetting relay 50 is also included in the system. Resetting relay 50 has a normally closed switch 51, a normally open switch 52, a normally open switch 53, a normally closed switch 54, and a normally open switch 55. A timer 60 having normally open switches 61 and 62, and an add-subtract switch indicated generally by the numeral 70 having normally closed switch 71 and normally open switches 72 and 73 are also provided in the system.

In operation, assume that oil is being pumped through pipeline 10 and that the end of the producing day has not yet occurred and the maximum daily allowable amount of oil has not been pumped through the pipeline 10. The various elements are then in the position shown in FIG. 1. Electrical current flows from the voltage source V through conducting line 82 including closed switch 41 and closed contact 30 to the solenoid valve 32 to keep the valve 32 open, thus permitting fluid flow through pipeline 10. No current flows through line 86 because of the open contact 73. Current flows through line 88 to the timer 60. However, the timer 60 is set so that the normally open contacts 61 and 62 are not closed until the end of the predetermined time period, say at 7:00 p.m. at the end of the producing day. Likewise, no current flows through conducting lines 90, 92, 94, and 98 because of open contacts 52, 62, 42, and 24, respectively.

Figure 2:
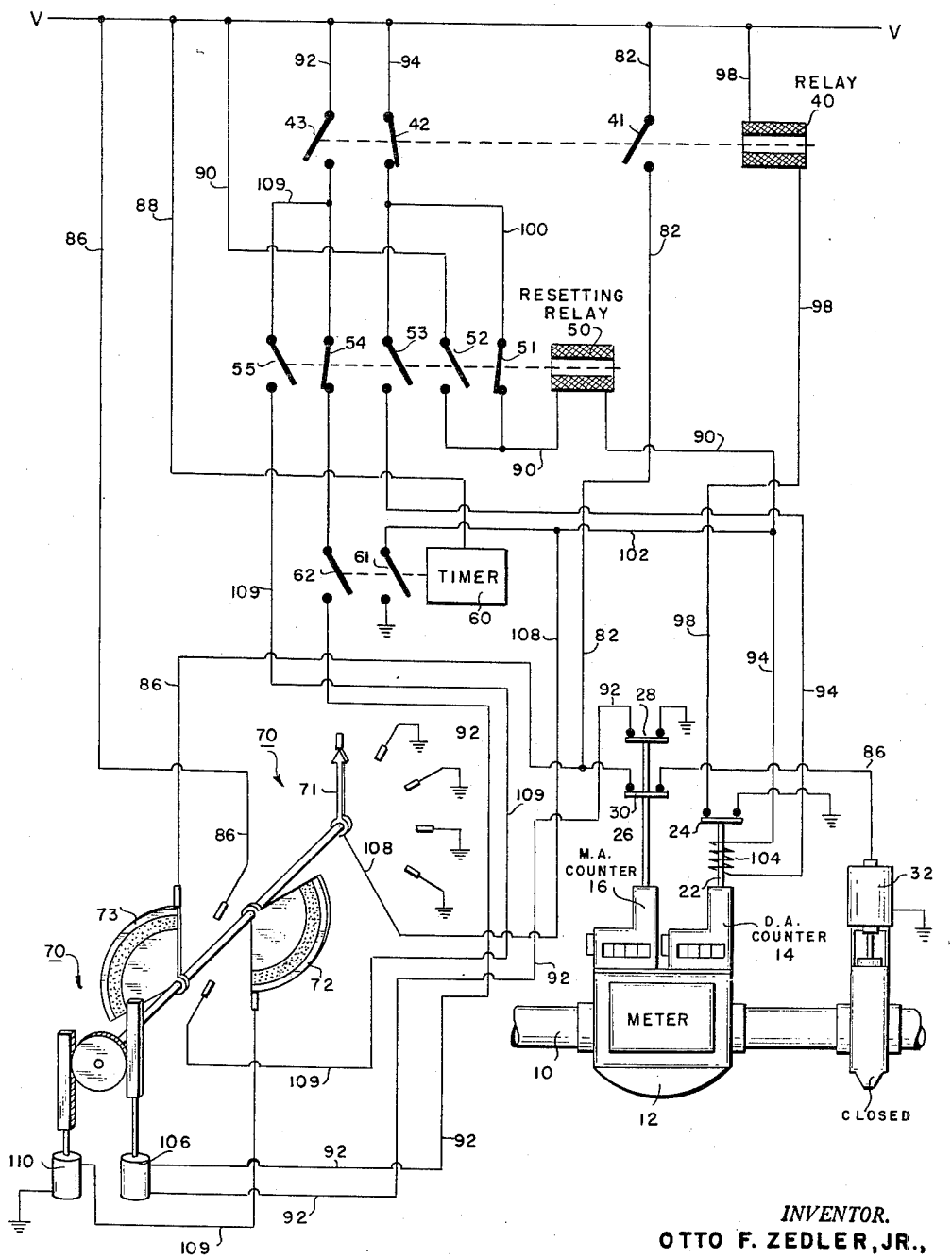
FIG. 2 is an electrical diagram showing the position of the elements when the daily allowable has been pumped through the pipeline before the end of the day.

If the daily allowable is pumped through pipeline 10 before the end of the producing day, say before 7:00 p.m., the flow of fluid through the pipeline 10 is stopped and the elements are in the position shown in FIG. 2. Notice that the shaft 22 on daily allowable counter 14 has moved upwardly to complete the circuit through line 98 and relay 40 from the voltage source V to ground. Thus, switching relay 40 is actuated to open relay switches 41 and 43 and close relay switch 42. The opening of relay switch 41 breaks the circuit through conducting lines 82 to solenoid valve 32, thus closing solenoid valve 32 to shut off the flow of oil through the pipeline 10. Despite the closing of relay switch 42, no current as yet flows through line 94 because resetting switch 53 and time switch 61 are in the open position. Also, switch 71 is still in the zero or ungrounded position.

Figure 3:
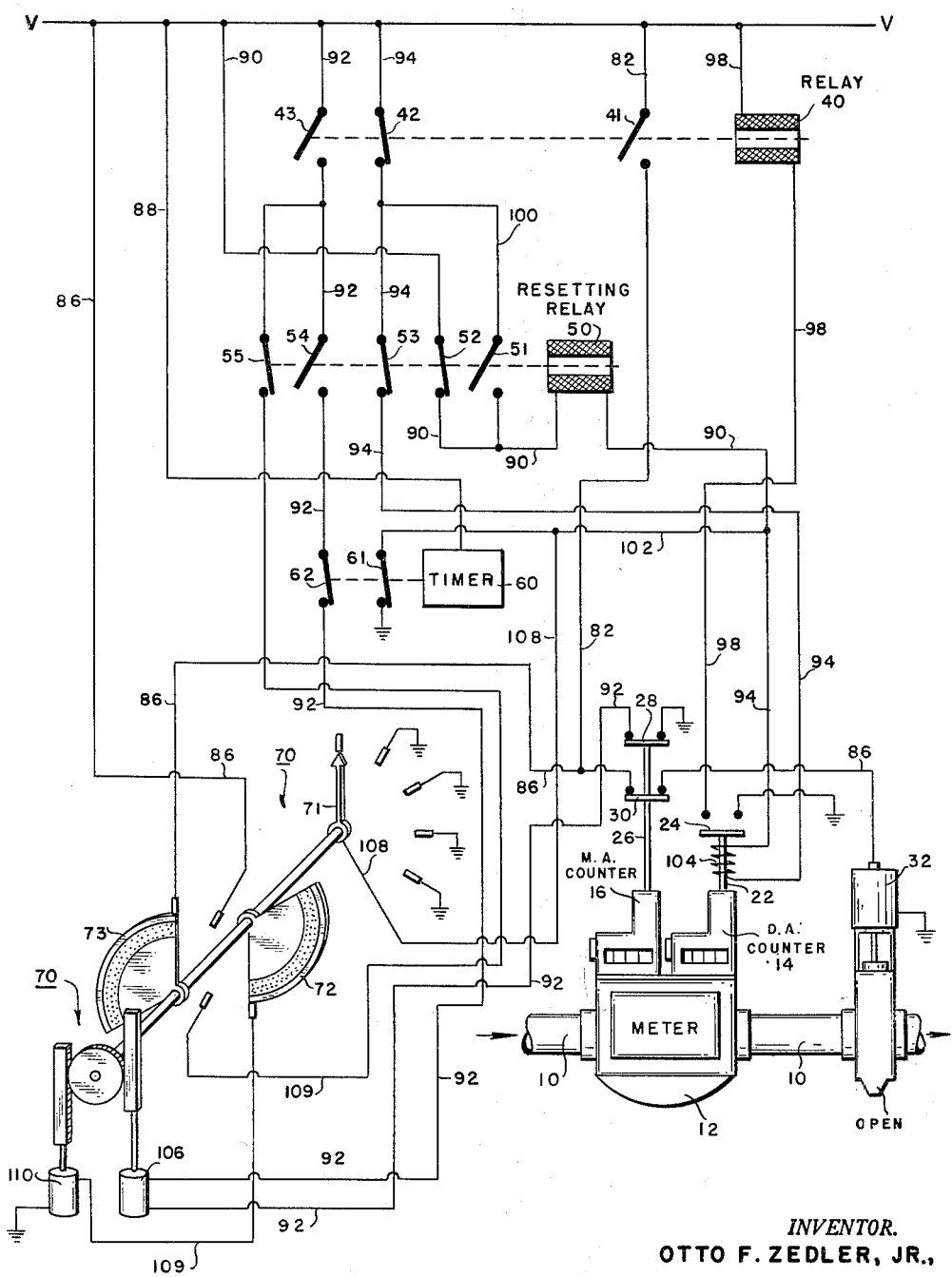
FIG. 3 is an electrical diagram showing the position of the elements after the daily period has expired and the allowable counter is reset preparatory to the next day's production.

The timer 60 is set so that at the end of the predetermined time period, in our example 7:00 p.m., time switch 61 and time switch 62 are closed. When time switch 61 is closed, current flows through line 100 through resetting relay switch 51, conducting line 90, and conducting line 102 through time switch 61 to ground. This completes a circuit through relay coil 50 and the positions of all of the resetting relay switches 51 through 55 are reversed from that shown in FIGS. 1 and 2. The position of the various elements in the automatic control system is then as shown in FIG. 3.

The structure of the resetting relay switches 51 and 52 is such that resetting relay switch 52 closes just before resetting relay switch 51 opens. Current now flows through line 90, including closed resetting relay switch 52, and relay coil 50 and conducting line 102, including time switch 61, to seal the resetting relay 50. The closing of resetting relay switch 53 completes the circuit including conducting line 94 with relay switch 42 and resetting relay switch 53, coil 104 schematically shown as wrapped about the daily allowable counter shaft 22 and conducting line 102, including time switch 61, to ground. Despite the closing of timing switch 62, no current flows through line 92 because of the open resetting switch contact 54.

The flow of current through coil 104 shown schematically as wrapped about the shaft 22 on the daily allowable counter 14 moves shaft 22 downwardly to disconnect contact 24, thus breaking the circuit through line 98 and relay 40. The relay contact switches 41 through 43 are then again reversed.

The timer 60 is set to keep the time switches 61 and 62 closed for a short period of time, say 5 minutes. After the termination of the 5-minute period, all of the elements return to their original position as shown in FIG. 1.

Figure 4:
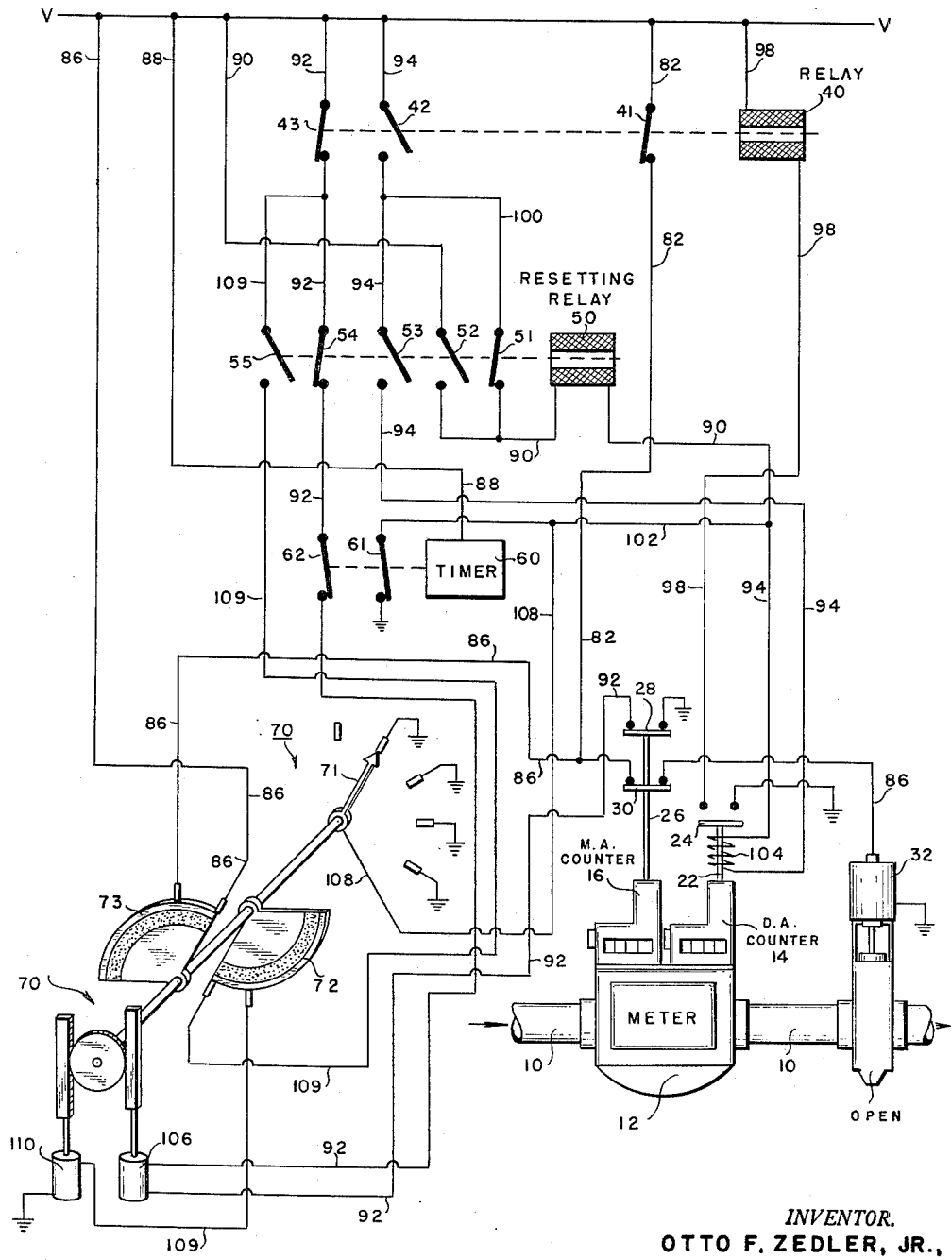
FIG. 4 is an electrical schematic diagram showing the position of the elements if the end of the day has expired before the daily allowable has been pumped through the pipeline.

Assume that on the second day of production the timer 60 is actuated at 7:00 p.m. to close time switch 61 and time switch 62 before the daily allowable of say 100 barrels has flowed through the pipeline 10. In this case, contact 24 on shaft 22 does not close the circuit including line 98 and relay 40. Thus, the relay switches 41 through 43 remain in their normal positions. Since relay switch 41 is closed, the circuit through line 82 to solenoid valve 32 remains operative to keep the valve 32 open and continue the flow of oil through pipeline 10. Despite the fact that time switch 61 is closed, the shaft 22 is not reset because relay switch 42 and reset relay switch 52 are open. The closing of time switch 62, however, completes the circuit through line 92 including relay switch 43, reset relay switch 54, time switch 62, and switch 28 on the monthly allowable counter shaft 26. This causes current to flow through a forward coil 106 constituting a part of the conducting line 92. Forward coil 106 is a portion of the add-subtract relay 70. The flow of current through forward coil 106 rotates switches 71, 72, and 73 clockwise (looking at FIG. 4) as a unit. The positions of the elements in the automatic system are then as shown in FIG. 4.

Notice that the closing of add-subtract relay switch 73 completes the circuit through conducting line 86 to the solenoid valve 32. Since conducting line 86 and conducting line 82 are arranged in parallel and both lead to the solenoid valve 32, solenoid valve 32 will be maintained open to continue the flow of oil through pipeline 10 as long as either one or both of the relay switches 41 and add-subtract relay switch 73 are closed.

Figure 5:
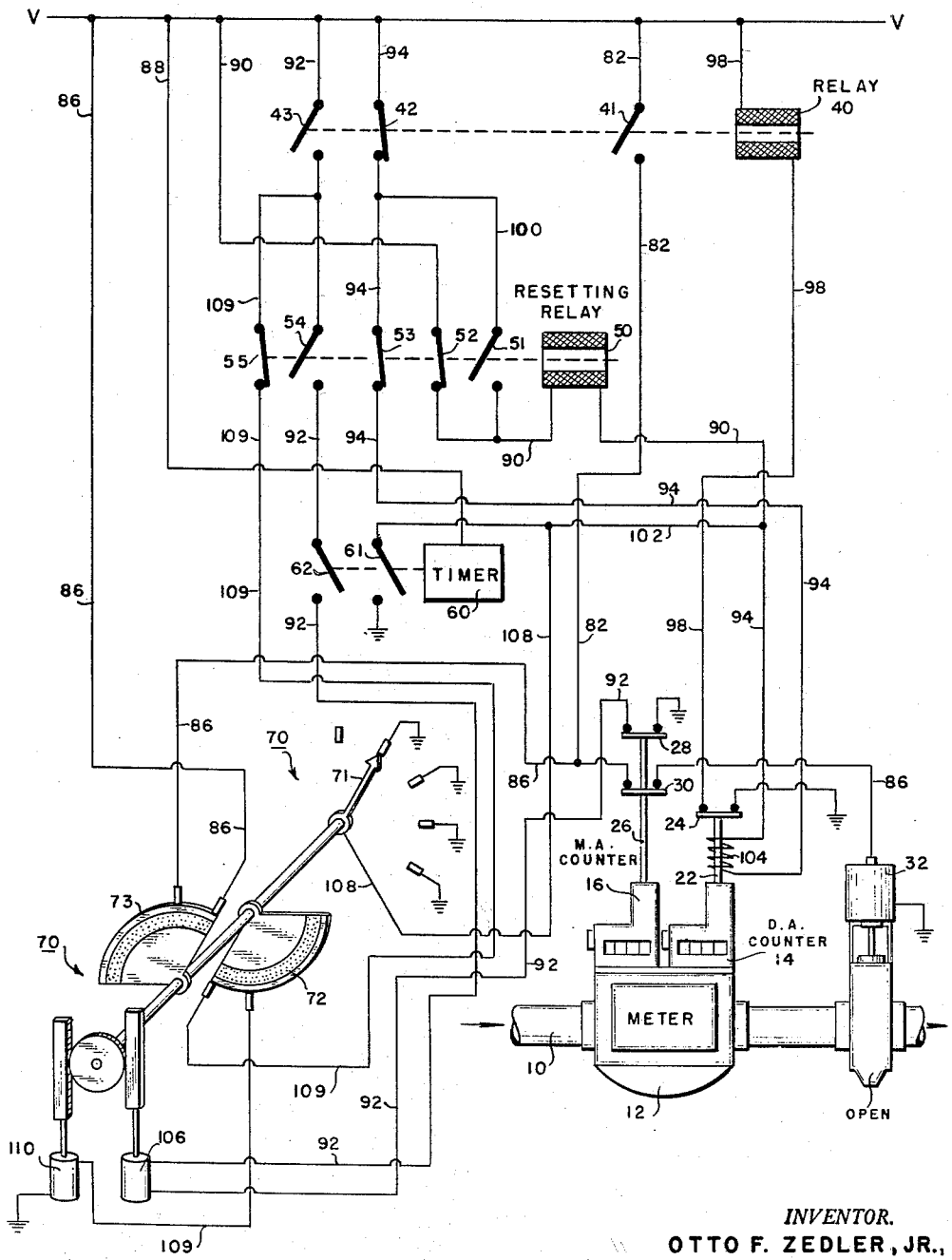
FIG. 5 is an electrical diagram showing the position of the elements just prior to resetting the allowable counter after the make-up amount of oil has flowed through the pipeline.

As the flow of make-up fluid continues, when the amount of allowable for the previous time period reaches 100 barrels, the positions of the elements of the control system will be as shown in FIG. 5. As shown in FIG. 5, contact 24 on shaft 22 of the daily allowable counter 14 has completed the circuit through line 98 and relay 40. This reverses the positions of relay contacts 41 through 43. Relay contact 41 is now open. However, the solenoid valve 32 is kept open to continue the flow of fluid through pipeline 10 because the circuit through the solenoid valve 32 is complete through line 86 including closed add-subtract relay contact 73.

The closure of relay contact 42 had completed the circuit through line 94 including relay contact 42, line 100 including previously closed contact 51, lines 90 and 102, and line 108 through switch 71 to ground. Thus, reset relay 50 was actuated and the positions of reset relay switches 51 through 55 were changed to the positions shown in FIG. 5 from the positions shown in FIG. 4.

The closing of reset switch 53 causes current to flow through coil 104 to reset the shaft 22 to the position shown in FIG. 1. The opening of contact 24 on daily allowable counter shaft 22 breaks the circuit through line 98 and relay 40 thus deactivating relay 40 to return the relay switches 41 through 43 to the positions shown in FIG. 1. The closing of relay switch 41 completes the circuit through line 82 to solenoid valve 32 to continue the flow of oil through the pipeline 10.

Relay switch 43 must be closed before reset relay switch 55 is opened. Thus, for a brief period of time, an electrical circuit is completed through line 92 including closed relay switch 43, line 109 including closed reset relay switch 55, and closed add-substract relay switch 72 to ground. The flow of current through line 109 causes current flow through a subtract coil 110 included as a part of the add-subtract relay 70. The flow of current through coil 110 reverses switches 71, 72, and 73 to return the switches 71, 72, and 73 to their original positions shown in FIG. 1.

Thus, all of the make-up oil has been flowed through the pipeline 10 and all of the elements in the automatic control system returned to the positions shown in FIG. 1 without stopping the continuous flow of oil through pipeline 10.

As shown in the figures, the add-substract relay switch is provided with a plurality of contact points for the switch 71. This may be necessary if, for example, the make-up is so large as not to be made up during the next succeeding day. In such case, it may be necessary to accumulate the make-up over several days. The add-subtract relay contacts 72 and 73 are designed to remain closed when switch 71 is in any position other than the zero position.

When the monthly allowable is obtained, the shaft 26 on the monthly allowable counter 16 is moved downwardly to open contacts 28 and 30 on shaft 26. This movement breaks the circuit including line 82 to the solenoid value 32 to shut off the flow of oil through pipeline 10. The opening of contact 28 in line 92 prevents the unnecessary actuation of the add-subtract relay 70 each time the time switch 62 is closed.

I claim:

1. A system for measuring the volume of fluid flowed past a point in a pipeline, limiting the volume of fluid to a predetermined maximum for a predetermined time period, and if less than the predetermined maximum has flowed past said point in the pipeline by the end of the predetermined time period, providing for the make-up of the difference comprising: a voltage source; a first electrical circuit including electrically controlled means for flowing fluid through the pipeline, and a meter, and a first switching means actuated in response to the obtainment of the predetermined maximum volume flowing through the meter to stop the flow of fluid, and a second switching means in parallel with said first switching means; and a timer switch, said timer switch being actuated at the end of the predetermined time period and if less than the predetermined maximum has flowed, serving to actuate said second switching means to continue the flow of fluid until the maximum volume has flowed, and means for resetting said first and second switching means.

2. A system for measuring the volume of fluid flowed past a point in a pipeline, limiting the volume of fluid to a predetermined maximum for a first predetermined time period, and if less than the predetermined maximum has flowed past said point in the pipeline by the end of the first predetermined time period, providing for the make-up of the difference in the next predetermined time period comprising: a source of voltage; at least three parallel circuits connected across said voltage source; a fluid flow control means in the first of the parallel circuits, said first parallel circuit including two parallel conducting lines in series with the flow control means; a normally open adding switch in one of said two parallel conducting lines; a normally closed relay switch in the other parallel conducting line; a normally open relay switch in the second of said parallel circuits, said second parallel circuit including two parallel conducting lines in series with the normally open relay switch, one of the conducting lines of said second parallel circuit having a normally open time switch and the other conducting line having a normally open adding switch; a series arrangement of a normally closed relay switch, a normally open time switch, and an adding switch coil in the third of said three parallel circuits, said adding switch coil controlling the positions of the adding switches in said first and second parallel circuits; means responsive to the flow of said predetermined maximum volume of fluid for reversing the positions of all of said three relay switches; a timer for closing said two time switches at the end of the predetermined time period; and means responsive to the flow of current through said second parallel circuit for resetting the relay switches to their normal positions.

References Cited in the file of this patent
UNITED STATES PATENTS

| | | |
|---|---|---|
| 1,876,512 | Pfening et al. | Sept. 6, 1932 |
| 2,872,072 | Reed | Feb. 3, 1959 |